United States Patent [19]

Koyama et al.

[11] Patent Number: 5,050,019
[45] Date of Patent: Sep. 17, 1991

[54] METHOD FOR AUTOMATIC CONTINUOUS CHANGING OF CARTRIDGE-TYPE MAGNETIC TAPES

[75] Inventors: Toshihiro Koyama; Munetake Kanna; Masatoshi Ishikawa, all of Odawara, Japan

[73] Assignee: Hitachi, Ltd., Tokyo, Japan

[21] Appl. No.: 305,648

[22] Filed: Feb. 3, 1989

[30] Foreign Application Priority Data

Feb. 19, 1988 [JP] Japan ................... 63-35091

[51] Int. Cl.$^5$ ............................................. G11B 15/68
[52] U.S. Cl. .......................................... 360/92; 360/71
[58] Field of Search ................. 360/92, 71, 69, 91; 369/34, 36, 38

[56] References Cited

U.S. PATENT DOCUMENTS

| | | | |
|---|---|---|---|
| 3,524,949 | 8/1970 | Kleve | 360/92 |
| 4,420,779 | 12/1983 | Takano et al. | 360/92 |
| 4,471,394 | 9/1984 | Hapke | 360/92 |
| 4,835,634 | 5/1989 | Ostwald | 360/92 |

FOREIGN PATENT DOCUMENTS

61-79856 5/1986 Japan .

Primary Examiner—David J. Severin
Attorney, Agent, or Firm—Fay, Sharpe, Beall, Fagan, Minnich & McKee

[57] ABSTRACT

One of the cartridge-type magnetic tapes set in a magazine is loaded into a magnetic tape unit, the magnetic tape thus loaded is data processed in the magnetic tape unit, and the data processed magnetic tape is then unloaded from the magnetic tape unit to be received into the magazine. This series of operations is sequentially repeated for all of the magnetic tapes set in the respective magazine steps. It is judged whether or not the data processed magnetic tapes set in the magazine have been replaced with fresh magnetic tapes yet to be data processed in the middle of the series of operations. If it is decided that the replacement of magnetic tapes has been done, the abovementioned series of operations, namely, the handling operations including the loading of a magnetic tape, data processing of the magnetic tape and receiving (unloading) of the magnetic tape, are continuously done for the magnetic tapes initially set in the magazine but yet to be data processed as well as the magnetic tapes replaced in the magazine and which are yet to be data processed.

7 Claims, 4 Drawing Sheets

METHOD FOR AUTOMATIC CONTINUOUS CHANGING OF CARTRIDGE-TYPE MAGNETIC TAPES

BACKGROUND OF THE INVENTION a) Field of the Invention

The present invention relates to a method for automatic continuous changing of cartridge-type magnetic tapes, and more particularly to a method for automatic continuous changing of cartridge-type magnetic tapes, which is suitable for use in continuously repeating the loading of a cartridge-type magnetic tape into a magnetic tape unit provided with an automatic threading facility and with which the automatic cartridge-type magnetic tape changer is used, and reception of the cartridge-type magnetic tape unloaded from the magnetic tape unit.

b) Description of the Related Art

With conventional automatic cartridge-type magnetic tape changers, a plurality of cartridge-type magnetic tapes (will be referred to as "cartridges" hereinafter) is set in a magazine. An object one of the cartridges is positioned in a cartridge inlet/outlet, and then loaded into a magnetic tape unit (will be referred to as "MT unit" hereinafter). After data-processing in the MT unit, the cartridge is unloaded from the latter and received again into the magazine. All these operations are automatically done.

One such automatic cartridge changer is disclosed in Japanese Unexamined Utility Model Publication (Kokai) No. 61-79856. In this automatic cartridge changer, for replacing the cartridges already data-processed in the MT unit with those yet to be data-processed in the MT unit, the magazine must be removed from the automatic cartridge changer. Therefore, in case the operator of such a conventional automatic cartridge changer wants to replace the data-processed cartridges in the magazine with cartridges yet to be data-processed, he must wait until all of the cartridges in the magazine have been data-processed. Otherwise, after the data processing of a cartridge currently loaded in the MT unit finishes, the operator must dismount the magazine interrupting the loading and data processing of a next cartridge, and replace a cartridge or cartridges already data-processed with a new cartridge or cartridges' the data of which he wants to process. Hence, the operator is compelled to perform troublesome tasks so that it takes a long time to replace the cartridges.

The disadvantages of and problems with the conventional techniques will be described in further detail. Assume for example that the magazine is designed to receive eight cartridges and that eight cartridges yet to be data-processed are initially set in the magazine. When the automatic cartridge changer has completed the data-processing handling of first the four, for example, among the eight cartridges yet to be data-processed, the operator interrupts the automatic cartridge changer and dismounts the magazine from the automatic cartridge changer. Further, he removes the data-processed four cartridges from the magazine, and sets into the magazine four fresh cartridges yet to be data-processed. Then, he sets the magazine into the automatic cartridge changer. Next, he starts the automatic cartridge changer for data-processing operations. In this case, the automatic cartridge changer will continuously effect the loading and reception for the four fresh cartridges set in the magazine and yet to be data-processed as well as for the cartridges initially set in the magazine. Therefore, after dismounting the cartridge from the automatic cartridge changer, he has to replace the fresh cartridges yet to be data-processed with the data-processed cartridges and remember the number of the cartridges which are to be replaced until he finishes the data processing task. Therefore, he is compelled to do troublesome and complicated operations with the automatic cartridge changer and he may also fail in such operations.

SUMMARY OF THE INVENTION

The present invention has an object to provide a method for automatic continuous changing of cartridges, in which when data-processed cartridges in the magazine have been replaced with cartridges yet to be data-processed in the course of a series of such sequential cartridge handling operations in an automatic cartridge changer for data processing of cartridges loaded from the changer into a magnetic tape unit (MT unit) and received into the magazine from the MT unit, the plurality of cartridges yet to be data-processed can be continuously loaded into the MT unit and the data-processed cartridges unloaded from the MT unit can be received into the magazine, all in an automatic manner.

The present invention has another object to provide a method for automatic continuous changing of cartridges, in which when data-processed cartridges in the magazine have been replaced with cartridges yet to be data-processed in the course of a series of such sequential cartridge handling operations in an automatic cartridge changer for data processing of cartridges loaded from the changer into an MT unit and received into the magazine from the MT unit, the operator is relieved from doing any operations after the replacement of cartridges.

According to the present invention, a series of cartridge handling operations including loading one of the cartridges set in the magazine into an MT unit, data processing of the cartridge in the MT unit and receiving the data-processed cartridge unloaded from the MT unit is sequentially repeated for each of the plurality of cartridges set in the respective magazine steps. In the course of the above-mentioned series of cartridge handling operations, it is judged whether or not the data-processed cartridges set in the magazine have been replaced with fresh cartridges yet to be data-processed. If it is decided that cartridges have been replaced, the above-mentioned series of cartridge handling operations, such as cartridge loading, data-processing and reception, is continuously done for the cartridges initially set in the magazine but yet to be data-processed as well as the fresh cartridges set as replaced in the magazine and which are yet to be data-processed.

These and other objects and advantages of the present invention will be better understood from the ensuing description made, by way of example, of the preferred embodiment with reference to the drawings.

DETAILED DESCRIPTION OF THE PREFERRED EMBODIMENT

Figure 1:
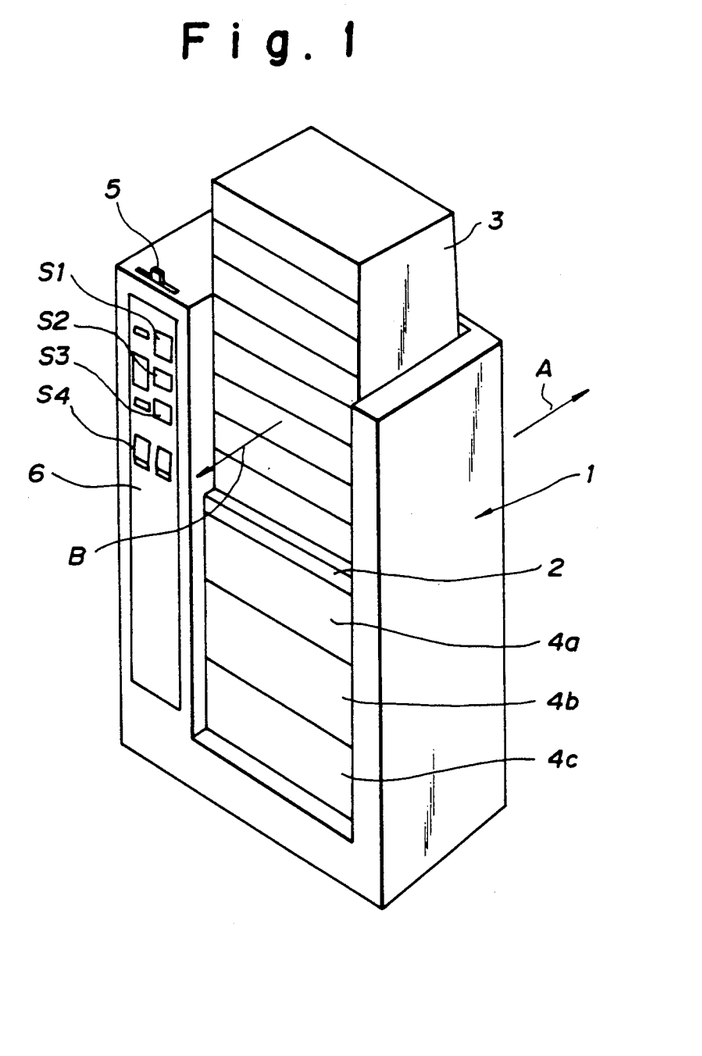
FIG. 1 is a schematic perspective external view of an automatic cartridge changer to which the present invention is applied.

FIG. 1 is a schematic perspective view of the automatic cartridge changer to which the present invention is applied. As shown, the automatic cartridge changer 1 has a vertically movable magazine mount 2 in which magazine 3 set. The magazine mount 2 of the automatic cartridge changer 1 provided at the lower front thereof with covers 4a, 4b and 4c which slide as the magazine mount 2 moves vertically. In the example shown, the magazine 3 is designed to receive eight cartridges (not shown) stacked on shelves, each corresponding to a step. An MT unit is located adjacent the changer in the direction of arrow A, receives a cartridge from the cartridge outlet/inlet (not shown) of the automatic cartridge changer, and processes the data in the cartridge. After completion of the data processing, the data-processed cartridge is returned into the cartridge inlet/outlet of the automatic cartridge changer. The magazine 3 is so designed that the cartridges therein can be manually taken out in the direction of arrow B. Namely, the operator can take out a cartridge by hand from the magazine 3 by operating an unlock knob 5 provided on the automatic cartridge changer 1. As shown in FIG. 1, a control panel 6 is provided on the front of the automatic cartridge changer 1. There are provided on this control panel 6 a start switch S1, select switch S2, magazine eject switch S3, mode switch S4, etc. The start switch S1 puts the automatic cartridge changer 1 into operation. The select switch S2 is provided to select a number of magazine steps counted from the bottom of the magazine 1, namely, a cartridge which is to be first data-processed. The magazine eject switch 3 enables the magazine to move up to the highest position in order to terminate the data processing for the cartridges in the magazine 3. The mode switch 4 is intended for selecting either a continuous mode or normal mode of operation.

Figure 2:
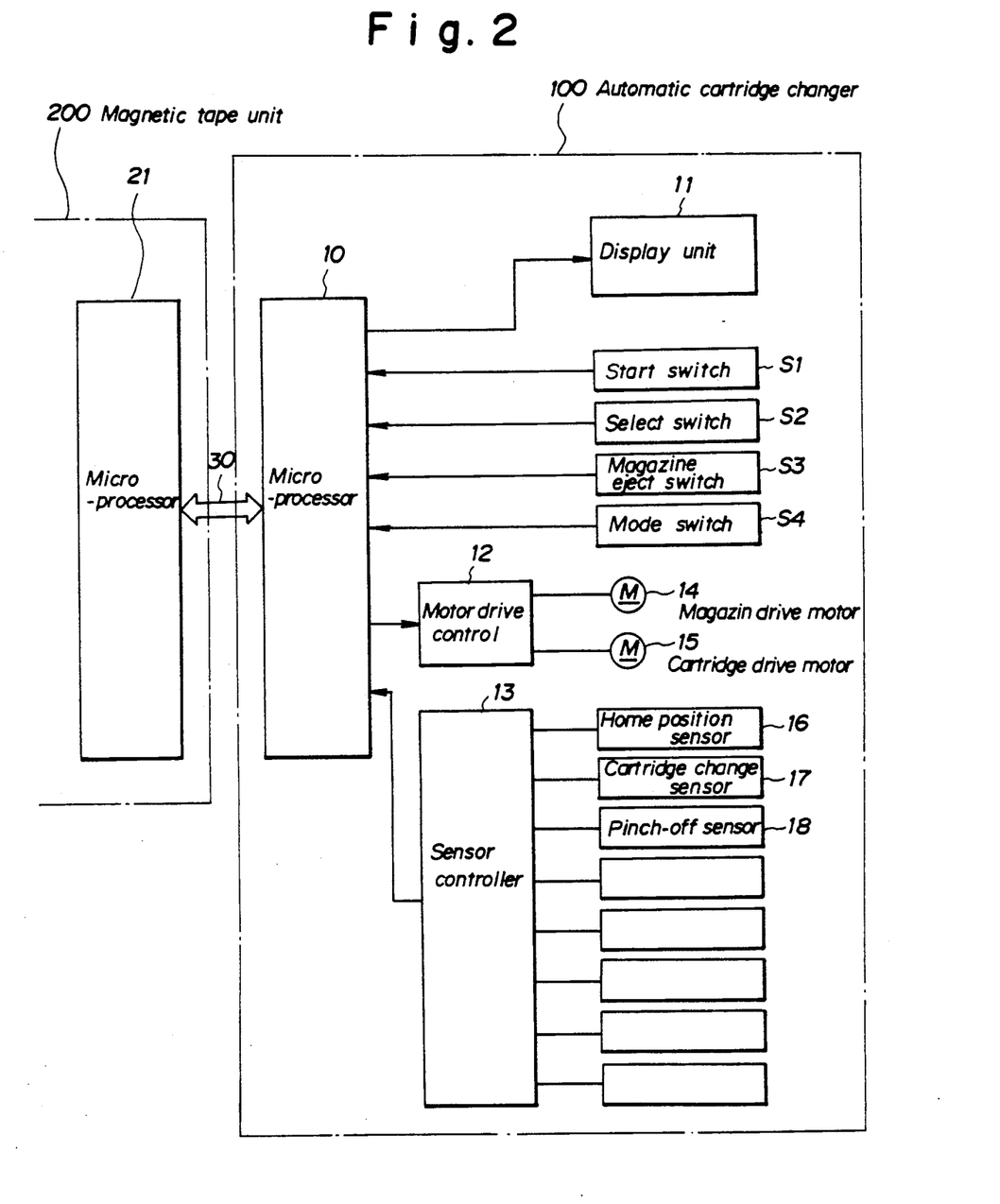
FIG. 2 is a block diagram of an example of an automatic cartridge changer to which the present invention is applied.

FIG. 2 is a block diagram showing an automatic cartridge changer 100 and a micro processor 21 of an MT unit 200. As shown, the micro processor 10 in the automatic cartridge changer 100 and the micro processor 21 of the MT unit 200 are connected to each other by a bus 30. The start switch S1, select switch S2, magazine eject switch S3 and mode switch S4 are connected to the micro processor 10. There is provided a magazine drive motor 14 connected to a motor drive control 12. The magazine drive motor 14 serves to move the magazine 3 vertically. Also, there is provided a cartridge drive motor 15 connected to the motor drive control 12 and which serves to load a cartridge into the MT unit and receive a cartridge unloaded from the MT unit. Further, the motor drive control 12 is connected to the micro processor 10. The output of a home position sensor 16 is connected to a sensor controller 13. The home position sensor 16 detects that the magazine 3 is in the home position. In this example, the home position is the highest level that the magazine 3 can be positioned. That is in the home position a cartridge at the lowest shelf or step is at a position in alignment with the outlet-/inlet of the automatic cartridge changer 1 for loading the cartridge into the MT unit 200. The output of the cartridge change sensor 17 is connected to the input of the sensor controller 13. The cartridge change sensor 17 detects that the cartridge is unlocked by the operator using the unlock knob 5 and manually taken out by him. Also there is provided a pinch-off sensor 18 of which the output is connected to the sensor controller 13. The pinch-off sensor 18 detects when the magazine has been lowered, and particularly when the magazine 3 has gone down one step. That is, the pinch-off sensor 18 is provided to detect that a next step or shelf of the magazine 3 is at the position of the cartridge outlet/inlet and the magazine mount 2 is lowered until the pinch-off sensor 18 detects that the magazine has fallen one step. When the pinch-off sensor 18 detects that the magazine has moved down one step, the counter (not shown) provided in the micro processor 10 that which indicates the number of magazine steps counts one up. This counter indicates which cartridge, as counted from the lowest one, is currently at the position of the cartridge outlet/inlet. Receiving the output signals from the aforementioned switches S1, S2, S3, S4 and the sensors 16, 17, 18, etc., the micro processor 10 controls the magazine drive motor 14 and cartridge drive motor 15 by means of the motor drive control 12. There is also provided a display unit 11 connected to the micro processor 10 to indicate a magazine step from which the cartridge currently subject to the data processing is loaded, an error message, etc. Note that the aforementioned home position sensor 16 and pinch-off sensor 18 can easily be implemented in the known manner using a photoelectric sensor.

Figure 3:
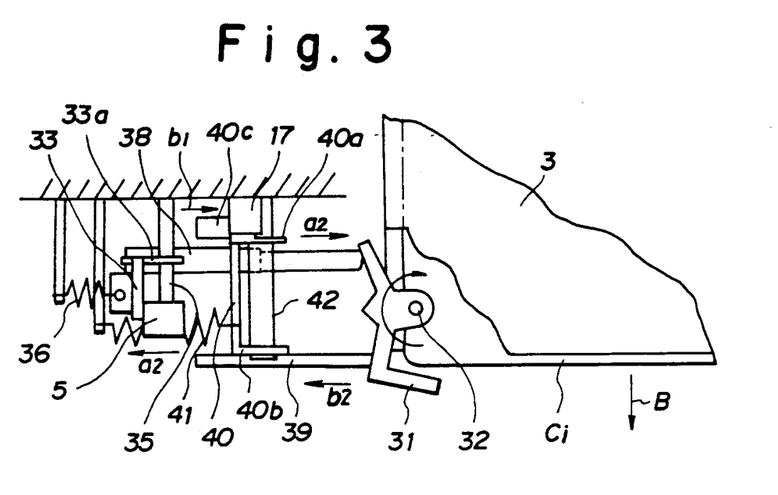
FIG. 3 is a schematic plan view of the mechanism which unlocks the cartridge and detects that the cartridges have been manually replaced.
Figure 4:
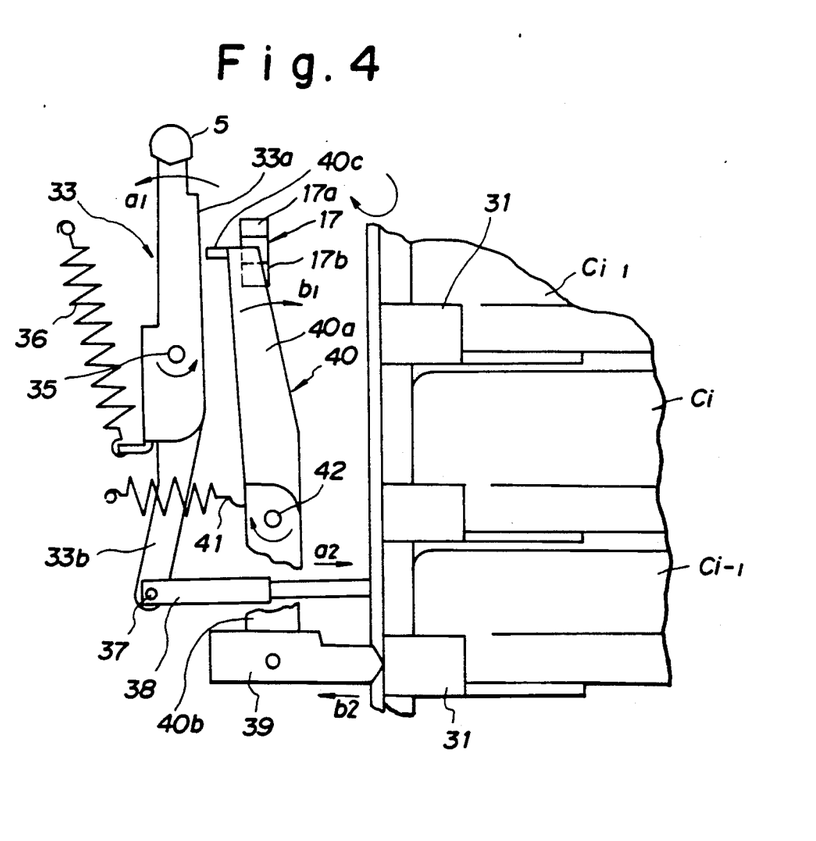
FIG. 4 is a schematic side elevation of the mechanism shown in FIG. 3.

FIGS. 3 and 4 are schematic drawings, respectively, showing a mechanism which unlocks the magazine 3 by the operator using the unlock knob 5 and detects a state in which the cartridge is taken out in the direction of arrow B. As shown in FIG. 3, a stopper 31 is provided on the magazine 3 and is formed to be pivotable about a shaft 32. This stopper 31 is normally locked by a rod 39. That is, the rod 39 is fixed to an arm 40b of a lever 40 formed rotatably about a shaft 42. Also, there is provided on the lever 40 a spring 41 with which an arm 40b of the lever 40 is forced in a direction opposite to the arrow b2. Therefore, the rod 39 fixed to the arm 40b normally locks the stopper 31, whereby each cartridge Ci (i = 1 to 8) is prevented from being taken out from the magazine 3 in the direction of arrow B from the magazine 3.

Each cartridge Ci is unlocked as will be described below by the operator using the unlock knob 5. There is provided a lever 33 with an arm 33a having the unlock knob 5 fitted on one end thereof. Also a rod 38 is rotatably connected to the lever arm 33b by means of a pin 37. The lever 33 is formed pivotably about a shaft 35 and forced in a direction opposite to the arrow a1. Therefore, when the operator moves the unlock knob 5 in the direction of arrow a1 against the force of a spring 36, the arm 33b of the lever 33 is moved in the direction of arrow a2 so that the rod 38 rotates one end of the stopper 32 in the direction of arrow a2. Thus, the other end of the stopper 31 is rotated in the direction of arrow b2 and the rod 39 is moved in the direction of arrow b2 against the force of the spring 41. As mentioned above, the rod 39 is fixed to the arm 40b of the lever 40 formed rotatably about a shaft 42. Therefore, an arm 40a of the lever 40 is rotated in the direction of arrow b1. Thus, the light beam emitted from a light emitter 17a to a photosensor 17b of the cartridge change sensor 17 is intercepted by a protrusion 40c of the arm 40a and it is detected that the cartridge Ci has been manually replaced.

Figure 5:
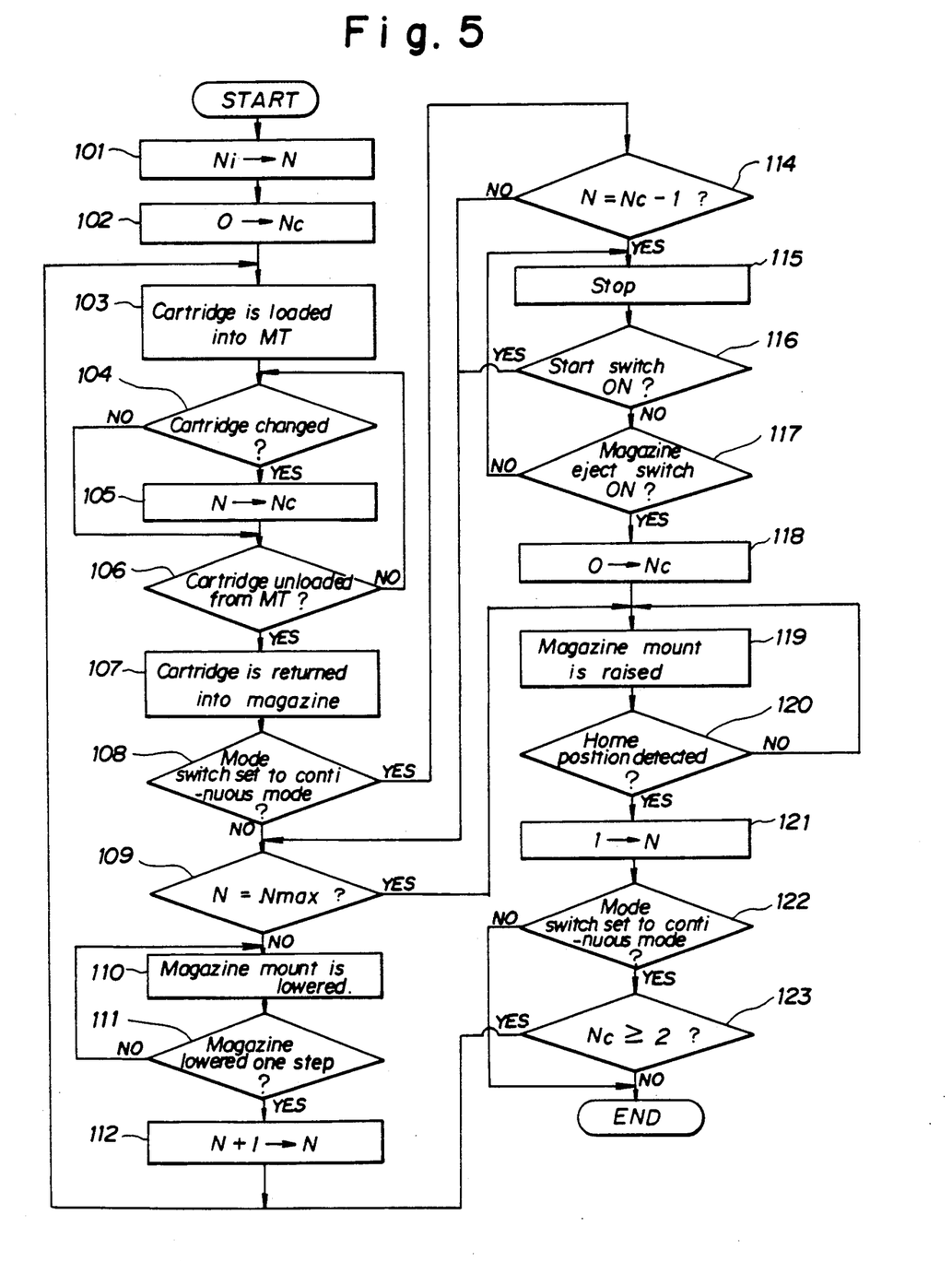
FIG. 5 is a flow chart showing the operations of the micro processor in the automatic cartridge changer shown in FIG. 2.

Next, the operation of this embodiment will be described in detail with reference to the flow chart shown in FIG. 5. The operations shown in this flow chart are classified into those in which the continuous mode and the normal mode of operation all performed depending upon the setting of the mode switch S4. First, the normal mode of operation will be explained.

At the step 101, a magazine step number Ni at which the data processing is to be started for a cartridge is set at N. The magazine 3 is vertically moved in general so that the lowest step is positioned at the cartridge outlet-/inlet (will be referred to as "loading position" hereinafter). The magazine step number Ni is set to "1" in general so that the data processing operation is started for the cartridge set at the lowest magazine step or shelf. This setting is effected by the select switch S2. At the next step 102, the value Nc is set at "0". The value Nc is the number of the magazine step that is in alignment with the loading position when the cartridges already data-processed are manually replaced with cartridges yet to be data-processed. When the value Nc is "0", it is meant that no cartridge has been replaced. Next, at the step 103, the cartridge positioned at the loading position is loaded into the MT unit 200. Further, at the step 104, it is judged whether or not the cartridge change sensor 18 has detected that cartridges have been replaced. In the normal mode of operation, no cartridge is replaced and the program proceeds to the step 106. At this step 106, it is judged whether or not the cartridge already data-processed has been unloaded from the MT unit 200. This judgement is effected as the micro processor 10 in the automatic cartridge changer 100 recognizes a cartridge unload signal issued from the micro processor 21 in the MT unit 200. In case it is decided that the cartridge has been unloaded, the cartridge is returned into place in the magazine 3 at the step 107. If it is decided that the cartridge has not yet been unloaded, the operations at the steps 104 and 106 are repeated until the cartridge is unloaded. The above-mentioned decision at the step 106 is done by analyzing a control signal delivered from the micro processor 21 in the MT unit 200. After the cartridge is received into the magazine 3 at the step 107, it is judged at the step 108 whether or not the mode switch S4 is set for the continuous mode. In this case, since the mode switch is set for the normal mode, the program goes to the step 109 where it is judged whether or not the value N is equal to the maximum value Nmax. If it is decided that the value N is not equal to the maximum value Nmax, the magazine mount 2 (magazine 3) is lowered at the step 110. The magazine mount 2 keeps going down until the pinch-off sensor 18 detects the one-step fall of the magazine 3 at the step 111. When the one-step fall of the magazine 3 is detected at the step 111, "1" is added to the value N indicative of the number for the magazine step at the loading position at the step 112, and the program goes back to the step 103. The operations at the steps 103 to 112 are repeated.

If it is decided that the value N indicating the number for the magazine step lowered to the loading position is equal to the maximum value Nmax at the step 109 (namely, in case the highest magazine step is at the loading position), the program proceeds to the step 119 where the magazine mount 2 is raised. The magazine mount 2 keeps going up until the home position sensor 16 detects the home position, namely, until the lowest magazine step is at the loading position, at the step 120. Next, at the step 121, the value N indicating the number for the magazine step at the loading position is set at "1" which is the initial value, and at the step 122, it is judged whether or not the mode switch S4 is set for the continuous mode of operation. Since the switch S4 is set for the normal mode in this case, the program is ended here.

Next, the operations in the continuous mode will be explained. In this case, the mode switch S4 is set for the continuous mode. The differences between the continuous and normal modes of operation at the steps 101 to 112 consist in the judgements at the steps 104 and 108, respectively.

Namely, at the step 104, it is judged whether or not cartridges already data-processed have been replaced with cartridges yet to be data-processed. This judgement is done by monitoring the output of the cartridge change sensor 17. If it is decided at the step 104 that the replacement of cartridges has been done, the value Nc is set at N at the step 105, and the program proceeds to the step 106. In case it is decided at the step 104 that the replacement of cartridges has not been done, the program immediately goes to the step 106 as in the normal mode. As previously described, the value Nc is the number for the magazine step at the loading position when cartridges already data-processed are manually replaced with cartridges yet to be data-processed. Therefore, in case the value N begins with the initial value "1", a value of the number of magazine steps for which the magazine mount 2 has been lowered (through the operations at the steps 110, 111 and 112) plus "1" is set as the value Nc.

At the step 108, it is judged whether or not the mode switch S4 is set for the continuous mode. In this case, it is decided that the switch S4 is so set, and the program proceeds to the step 114. At this step 114, it is judged whether $N=Nc-1$ is valid or not. If it is decided that the relation is not valid, the program goes back to the step 109. When it is decided that it is valid, the program proceeds to the step 115 and the cartridge handling operation is stopped. As having been described in the foregoing, the value Nc is the number for the magazine step at the loading position when cartridges already data-processed are replaced with cartridges not yet data processed. Therefore, when $N=Nc-1$ is valid, it is meant that the data processing operation for the last one of the cartridges yet to be data-processed is completed. Thus, if it is decided at the step 114 that $N=Nc-1$ is valid, the program proceeds to the step 115 at which the cartridge handling operation is stopped. When it is decided that $N=Nc-1$ is not valid, the program goes back to the step 109 where the cartridge handling operation is continued.

If it is decided at the step 109 that $N=Nmax$ is valid, is meant that the data processing operation for the cartridge set at the highest magazine step has been completed. Therefore, the program proceeds to the step 119 and the operations at the steps 119 to 123 are done. The differences of the operations at these steps 119 to 123 from those in the normal mode are that when it is decided that the mode switch S4 is set for the continuous mode, the program proceeds to the step 123 and it is judged at the step 123 whether or not the relation that Nc is equal to or larger than 2 is valid.

If it is decided that the relation that Nc is equal to or larger than 2 is not valid, the cartridge data processing operation is ended. Namely, if the relation that Nc is equal to or larger than 2 is not valid, it is meant that Nc is "0" or "1". In case Nc is "0", it is meant that the replacement of cartridges has not been done. If Nc is "1", it is meant that all the cartridges at the second magazine step and higher steps except for the cartridge at the lowest magazine step have been replaced. Therefore, in such case, the cartridge handling operation is stopped since all of the cartridges have already been data-processed.

In case it is decided that the relation of Nc is equal to or larger than 2 is valid, the program proceeds to the step 103 and the cartridge handling operation is continuously done. Namely, when it is decided that the relation of Nc is equal to or larger than 2 is valid, it is meant that the cartridges (cartridges replaced but yet to be data-processed) set at the (Nc−1)th magazine step and lower steps have not yet been data-processed. Hence, the program goes back to the step 103, and a sequence of operations at the steps 103 to 108 and 114, 109 to 112 are continuously done. If it is decided at the step 114 that the relation that N is equal to or larger than 2 is valid (it is meant that all the cartridges replaced have been data-processed), the cartridge handling operation is stopped at the step 115. It is judged at the step 116 whether or not the start switch S1 is set on. If it is decided at the step 116 that the start switch S1 is switched on, the program proceeds to the step 109 again. If it is decided at the step 116 that the start switch S1 is switched off, the program proceeds to the step 117, and the operations at the steps 115 to 117 are repeated until the magazine eject switch S3 is turned on.

In case it is decided at the step 117 that the magazine eject switch S3 is set on, the value Nc is set to the initial value "0" at the step 118 and the sequence of operations at the steps 119 to 123 is effected. Since the value Nc is set to the initial value "0" in this case, it is decided at the step 123 that the relation of Nc is equal to or larger than 2 is not valid, and the cartridge handling operation is ended.

In the embodiment having been described in the foregoing, the home position is set at a position where the magazine 3 is elevated to the upper limit (namely, the lowest step of the magazine 3 is aligned with the loading position). However, the present invention is not limited to this embodiment and the home position may be set at a position where the magazine is lowered to the lower limit (namely, the highest step of the magazine 3 is leveled aligned with the loading position). In this case, as the magazine 3 is lifted up, the cartridge is data-processed.

What is claimed is:

1. A method for continuous changing of cartridge-type magnetic tapes with a cartridge changer by loading/unloading the cartridges into an adjacent magnetic tape unit, comprising the steps of:
    setting a plurality of cartridge-type magnetic tapes in a magazine and loading the magazine into the tape changer;
    performing a cartridge-type magnetic tape handling operation with the cartridge changer including loading one of said cartridge-type magnetic tapes set in said magazine into said magnetic tape unit, data processing the one cartridge-type magnetic tape loaded in said magnetic tape unit and receiving in said magazine the one cartridge-type magnetic tape after being unloaded from said magnetic tape unit;
    sequentially repeating the cartridge handling operation for each of the cartridge-type magnetic tapes set in said magazine;
    prior to completing the performing of the cartridge handling operation for each of said cartridge-type magnetic tapes, replacing data processed ones of said cartridge-type magnetic tapes set in said magazine with fresh cartridge-type magnetic tapes yet to be data processed; and
    continuing with the performing of the cartridge handling operation for each of said cartridge-type magnetic tapes set in said magazine that have not yet been data processed and for the fresh cartridge-type magnetic tapes replaced in said magazine.

2. A method for continuous changing of cartridge-type magnetic tapes with a cartridge changer by loading/unloading the cartridges into an adjacent magnetic tape unit, comprising:
    a first step of setting a plurality of cartridge-type magnetic tapes in a magazine and loading the magazine into the cartridge changer;
    a second step of performing a cartridge handling operation including loading one of said cartridge-type magnetic tapes set in said magazine into said magnetic tape unit, data processing the one cartridge-type magnetic tape loaded in said magnetic tape unit and receiving in said magazine the one cartridge-type magnetic tape after being unloaded from said magnetic tape unit;
    a third step of sequentially repeating said cartridge handling operation for each of the cartridge-type magnetic tapes set in said magazine;
    a fourth step of judging whether data processed ones of the cartridge-type magnetic tapes set in said magazine have been replaced with fresh cartridge-type magnetic tapes yet to be data processed prior to completing the third step; and
    a fifth step, responsive to judging in said fourth step that data processed ones of the cartridge-type magnetic tapes have been replaced, of performing said second step on the cartridge-type magnetic tapes set in said magazine in said first step, and on the fresh cartridge-type magnetic tapes replaced in said magazine prior to said fourth step, that are also yet to be data processed.

3. A method for continuous changing of cartridge-type magnetic tapes with a cartridge changer by loading/unloading the cartridges into an adjacent magnetic tape unit, comprising:
    a first step of setting a plurality of cartridge-type magnetic tapes in a magazine and loading the magazine into the cartridge changer, said magazine having a plurality of means for receiving and supporting cartridge-type magnetic tapes;
    a second step of performing a cartridge handling operation including loading one of said cartridge-type magnetic tapes set in said magazine into said magnetic tape unit, data-processing the one cartridge-type magnetic tape loaded in said magnetic tape unit and receiving in said magazine the one cartridge-type magnetic tape unit after being unloaded from said magnetic tape unit;
    a third step of sequentially repeating the second step for each of the cartridge-type magnetic tapes set in said magazine, of replacing at least one of said data processed cartridge-type magnetic tapes set in said magazine with a fresh cartridge-type magnetic tape yet to be data processed, and of judging each said receiving and supporting means as to whether a fresh cartridge-type magnetic tape yet to be data processed is supported therein; and a fourth step, responsive to judgment in said third step, of performing said second step for each of the cartridge-type magnetic tapes originally set in said magazine in said first step that have yet to be data processed as well as the fresh cartridge-type magnetic tapes replaced in said magazine in said third step that are also not yet data processed.

4. A method for automatic continuous changing of cartridge-type magnetic tapes housed in a magazine supported in a cartridge changer by loading/unloading each cartridge into/out of a magnetic tape unit through an inlet/outlet of said changer when said each of said cartridges is at a loading position obtained by moving said magazine in stepwise movement until the respective cartridge is in alignment with the inlet/outlet of the changer, comprising:

a first step of setting a plurality of cartridge-type magnetic tapes in a magazine and loading the magazine into the cartridge changer;

a second step of performing a cartridge handling operation including loading one of said cartridge-type magnetic tapes set in said magazine at a step in alignment with the loading position for a magnetic tape unit, data processing the one cartridge-type magnetic tape loaded in said magnetic tape unit and receiving in said magazine the one cartridge-type magnetic tape after being unloaded from said magnetic tape unit;

a third step of sequentially repeating said second step for each of the cartridge-type magnetic tapes set in said magazine, including moving said magazine by one step for each cartridge handling operation, of judging whether data processed ones of said cartridge-type magnetic tapes set in said magazine have been replaced with fresh cartridge-type magnetic tapes yet to be data processed;

a fourth step, responsive to deciding in said third step that the data processed cartridge-type magnetic tapes have been replaced, of judging whether all of the cartridge-type magnetic tapes set in said magazine in said first step have been data processed; and a fifth step, responsive to judging in said fourth step that all of the cartridge-type magnetic tapes set in said magazine in said first step have been data processed, of moving said magazine so that the fresh cartridge-type magnetic tapes set in said magazine are positioned in alignment with said loading position.

5. A method for continuous changing of cartridge-type magnetic tapes housed in a magazine supported in a cartridge changer by loading/unloading each cartridge into/out of a magnetic tape unit through an inlet/outlet of said changer when said cartridges are at a loading position obtained by moving said magazine in stepwise movement until a respective one of the cartridges is in alignment with the inlet/outlet of the changer, comprising:

a first step of setting a plurality of cartridge-type magnetic tapes in a magazine and loading the magazine into the cartridge changer, said magazine having a plurality of means for receiving and supporting cartridge-type magnetic tapes;

a second step of performing a cartridge handling operation including loading one of said cartridge-type magnetic tapes that is positioned in alignment with the loading position into a magnetic tape unit, data processing the one cartridge-type magnetic tape loaded in said magnetic tape unit, and receiving in said magazine the one cartridge-type magnetic tape after being unloaded from said magnetic tape unit;

a third step of sequentially repeating said cartridge handling operation for each of the cartridge-type magnetic tapes set in said magazine including moving said magazine by one step after each cartridge handling operation step is completed, of replacing at least one of said data processed cartridge-type magnetic tapes with a fresh cartridge-type magnetic tape yet to be data processed, and of judging each said receiving and supporting means to determine whether a fresh cartridge-type magnetic tape is supported therein;

a fourth step, responsive to said judgment of said third step, of judging whether all of the cartridge-type magnetic tapes set in said magazine at said first step have been data processed; and a fifth step, responsive to said judging of said fourth step that all of the cartridge-type magnetic tapes set in said magazine in said first step have been data processed, of moving said magazine to a position in which the fresh cartridge-type magnetic tapes set in said magazine to be data processed are in alignment with the loading position.

6. A method for continuous changing of cartridge-type magnetic tapes housed in a magazine having a plurality of steps that is supported in a cartridge changer by loading/unloading each cartridge into/out of a magnetic tape unit through an inlet/outlet of said changer when said cartridges are at a loading position obtained by moving said magazine in stepwise movement until a respective one of the cartridges is in alignment with the inlet/outlet of the changer, comprising:

a first step of setting each of said cartridge-type magnetic tapes in a respective one of the plurality of steps in said magazine;

a second step of assigning a first value that indicates a magazine step that supports one of the cartridge-type magnetic tapes with which the data processing is to begin;

a third step of assigning an initial value as a second value indicating a magazine step that is at the loading position at time when fresh cartridgetype magnetic tapes are replaced for data processed ones of said cartridges in said magazine;

a fourth step in which a cartridge-type magnetic tape set at the magazine step corresponding to said first value is loaded into a magnetic tape unit;

a fifth step in which it is judged whether the cartridge-type magnetic tapes have been replaced, and setting said first value to be said second value if it is judged that the cartridge-type magnetic tapes have been replaced;

a sixth step of judging whether said one cartridge-type magnetic tape has been unloaded from said magnetic tape unit, including setting the unloaded cartridge-type magnetic tape into a magazine step corresponding to said first value when the one cartridge-type magnetic tape has been unloaded;

a seventh step of judging whether a mode switch is switched to one normal mode of operation in which the replacement of cartridge-type magnetic tapes is not conducted during the course of a cartridge handling operation and a continuous mode of operation in which the replacement of cartridge-type magnetic tapes is conducted in the course of the cartridge handling operation, including judging whether a value of said second value minus "1" is equal to said first value when it is decided that the mode switch is switched to the continuous mode of operation;

an eighth step of judging whether the first value is equal to a maximum value of the number of magazine steps when it is decided at said seventh step that the value of said second value minus "1" is not equal to said first value;

a ninth step for moving said magazine by one step and updating said first value when it is decided in said eighth step that said first value is not equal to the maximum number of magazine steps;

a tenth step for repeating said fourth to ninth steps;

an eleventh step for moving said magazine in a direction so that the lowest magazine step is at the loading position of the tape changer and said first value is set to "1" when it is judged at said eighth step that said first value is equal to the maximum number of magazine steps;

a twelfth step for judging whether the mode switch is switched to the continuous mode of operation and for judging whether said second value is greater than "2" when it is decided that the continuous mode of operation is being conducted;

a thirteenth step responsive to deciding in said twelfth step that said second value is greater than "2" of repeating said fourth to ninth steps; and a fourteenth step responsive to deciding in said seventh step that a value of said second value minus "1" is equal to said first value of stopping the cartridge handling operation.

7. A method according to claim 6, wherein after the processing is stopped at said fourteenth step, said magazine is moved to a position wherein the lowest magazine step is at the loading position of the tape changer.

* * * * *